No. 784,807. PATENTED MAR. 14, 1905.
H. G. REIST.
DYNAMO ELECTRIC MACHINE.
APPLICATION FILED AUG. 1, 1904.

WITNESSES:
Robt C. Chapman
Helen Orford

INVENTOR:
Henry G. Reist,
by Albert G. Davis
Atty.

No. 784,807. Patented March 14, 1905.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE.

SPECIFICATION forming part of Letters Patent No. 784,807, dated March 14, 1905.

Application filed August 1, 1904. Serial No. 218,988.

*To all whom it may concern:*

Be it known that I, HENRY G. REIST, a citizen of the United States, residing at Schenectady, in the county of Schenectady and State of New York, have invented certain new and useful Improvements in Dynamo-Electric Machines, of which the following is a specification.

My invention relates to the construction of dynamo-electric machines, and refers particularly to the armatures or rotors of alternating-current motors.

It is well understood in the art that an induction-motor having a squirrel-cage rotor-winding takes a large starting-current and has a small starting torque. In order to increase the starting torque and decrease the starting-current, it is necessary to insert resistance in the secondary circuit. The insertion of resistance, however, requires a coil-wound rotor with collector-rings or switching devices for cutting out the resistance when the motor is up to speed, since if the resistance were left in circuit the efficiency at full speed would be materially reduced.

My invention consists in providing a novel arrangement for squirrel-cage windings which enables them to exhibit to a certain extent at starting the characteristics of a coil-wound armature with resistance in circuit and at full load to operate like an ordinary squirrel-cage armature. I accomplish this without employing collector-rings or switching devices of any kind by means of a novel construction of short-circuiting end rings for a squirrel-cage winding of such cross-section that they heat rapidly at starting, so as to produce an appreciable resistance in the armature-circuit, and so arranged that they are efficiently cooled by the circulation of air produced by the rotation of the armature at full speed, whereby the resistance is lowered by such an amount that the rotor-winding acts at full speed like an ordinary squirrel-cage.

My invention will best be understood by reference to the accompanying drawings, in which—

Figure 1:
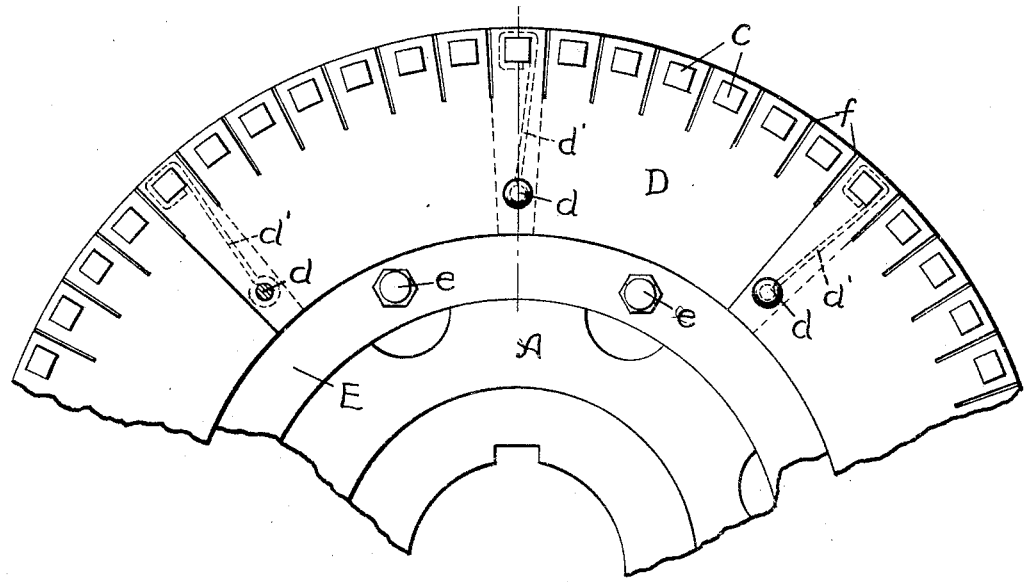
Figure 2:
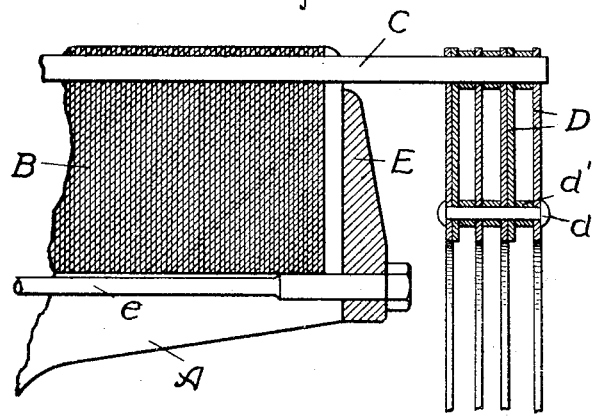

Figure 1 shows an end view of a portion of an armature or rotor of an induction-motor arranged in accordance with my invention, and Fig. 2 shows the same in cross-section.

In the drawings, A represents the armature-spider, carrying the laminations B. The laminations B are provided with holes or slots to receive the conductors C. The laminations are held pressed together by the end plates E and bolts *e*, as is clearly shown in Fig. 2.

D represents the end rings short-circuiting the rotor-conductors. The end rings instead of being composed of a single solid ring are composed of a number of flat plates overlapping to form a plurality of flat parallel rings separated by small air-spaces. The rings are shown held together by the rivets *d* and are properly spaced from each other by the strips *d'*, inserted edgewise between adjacent end rings and having both ends bent over a conductor and a rivet, respectively, which holds the spacing-strip securely in place. The plates D may be made of sufficiently small cross-section to heat rapidly at starting, and thereby to introduce an appreciable amount of resistance into the circuit of the armature. This resistance serves to increase the starting torque; but when the motor is up to speed the air passing radially outward between the plates reduces the temperature by such an amount that the resistance falls, so that the armature-conductors are practically short-circuited. The radially-arranged spacing-strips act like the vanes of a blower and produce a strong circulation of air between the end plates. The division of the end rings into a plurality of flat plates gives a large cooling-surface, which renders it possible to reduce the temperature sufficiently at full speed. The resistance of the short-circuiting rings may be adjusted by the slots *f* between adjacent conductors. These slots by cutting the straight line joining adjacent conductors prevent the current from flowing straight from one conductor to another. By increasing the depth of these slots the resistance of a ring of given cross-section may be increased.

I do not desire to limit myself to the particular construction and arrangement of parts shown; but I aim in the appended claims to cover all modifications which are within the scope of my invention.

What I claim as new, and desire to secure by Letters Patent of the United States, is—

1. In an alternating-current motor, a rotor-body, conductors carried thereby, and a plurality of flat parallel rings separated by air-spaces and short-circuiting the ends of said conductors.

2. In an alternating-current motor, a rotor-body, conductors carried thereby, and flat plates arranged to form a plurality of flat parallel rings separated by air-spaces and short-circuiting the ends of said conductors.

3. In an alternating-current motor, a rotor-body, conductors carried thereby, and a plurality of flat parallel rings separated by air-spaces and short-circuiting the ends of said conductors, said rings being slotted between adjacent conductors.

4. In an alternating-current motor, a rotor-body, conductors carried thereby, and a flat ring short-circuiting the ends of said conductors and slotted to cut the straight lines joining adjacent conductors.

5. In an alternating-current motor, a rotor-body, conductors carried thereby, a plurality of flat parallel rings separated by air-spaces, and short-circuiting the ends of said conductors, and radially-arranged spacing-strips inserted between adjacent rings.

In witness whereof I have hereunto set my hand this 29th day of July, 1904.

HENRY G. REIST.

Witnesses:
BENJAMIN B. HULL,
HELEN ORFORD.